United States Patent
Yang et al.

(10) Patent No.: US 7,300,570 B2
(45) Date of Patent: Nov. 27, 2007

(54) APPARATUS AND METHOD FOR TREATING WASTEWATER USING CONTACT MEDIA

(75) Inventors: Kihae Yang, Chunju (KR); Koseok Dock, Jeonja (KR)

(73) Assignee: SE GI Synthetic Environment Co., Ltd. (KR)

( * ) Notice: Subject to any disclaimer, the term of this patent is extended or adjusted under 35 U.S.C. 154(b) by 24 days.

(21) Appl. No.: 10/530,241

(22) PCT Filed: Feb. 27, 2003

(86) PCT No.: PCT/KR03/00390

§ 371 (c)(1),
(2), (4) Date: Apr. 4, 2005

(87) PCT Pub. No.: WO2004/076365

PCT Pub. Date: Sep. 10, 2004

(65) Prior Publication Data

US 2006/0163158 A1   Jul. 27, 2006

(51) Int. Cl.
*C02F 3/04*   (2006.01)
(52) U.S. Cl. .................. 210/151; 210/195.1; 210/615; 210/903
(58) Field of Classification Search ............... 210/150, 210/151, 195.1, 202, 259, 615, 617, 622, 210/631, 748, 903, 906
See application file for complete search history.

(56) References Cited

U.S. PATENT DOCUMENTS

| | | | | |
|---|---|---|---|---|
| 2,200,580 A | * | 5/1940 | Pruss et al. | 210/617 |
| 2,283,166 A | * | 5/1942 | Buell et al. | 210/615 |
| 2,366,917 A | * | 1/1945 | Levine | 210/617 |
| 2,992,986 A | * | 7/1961 | Ingram | 210/150 |
| 4,179,374 A | * | 12/1979 | Savage et al. | 210/151 |
| 4,427,548 A | * | 1/1984 | Quick, Jr. | 210/617 |
| 4,465,594 A | * | 8/1984 | Laak | 210/151 |
| 6,123,840 A | * | 9/2000 | Suzuki et al. | 210/151 |
| 6,524,447 B1 | * | 2/2003 | Carmignani et al. | 210/748 |
| 2003/0209501 A1 | * | 11/2003 | Leung | 210/748 |

FOREIGN PATENT DOCUMENTS

| | | | |
|---|---|---|---|
| JP | 5-15887 | * | 1/1993 |
| JP | 11-128969 | * | 5/1999 |
| KR | 1995-0011768 | | 10/1995 |
| KR | 1998-16159 A | | 5/1998 |
| KR | 1999-35047 U | | 9/1999 |
| KR | 10-0330923 | | 4/2002 |
| KR | 10-0336263 B1 | | 5/2002 |
| KR | 2002-92291 A | | 12/2002 |
| KR | 2002-92872 A | | 12/2002 |

* cited by examiner

*Primary Examiner*—Christopher Upton
(74) *Attorney, Agent, or Firm*—Akerman Senterfitt

(57) ABSTRACT

Disclosed is an apparatus and method for treating wastewater using contact media. The water treatment apparatus includes a biofilm reactor (13) including first and second biofilm contact layers (2 and 3) alternately arranged in a hopper, a precipitator (9) for receiving wastewater from a wastewater collecting tank and purified wastewater from a collecting hopper (4), and precipitating sludge contained in the wastewater, the precipitator (9) being connected with a sludge discharge pipe (8), and a wastewater circulating unit (11) for recycling decant water in the precipitator (9) into the biofilm reactor (13), using a circulating pump (10). By this arrangement, it is possible to achieve a considerable enhancement in wastewater purification efficiency while achieving compactness of the installation because sewage, sanitary sewage, and wastewater can be purified by the alternating biofilm contact layers vertically arranged in pairs to form a multi-stage laminated structure.

2 Claims, 13 Drawing Sheets

APPARATUS AND METHOD FOR TREATING WASTEWATER USING CONTACT MEDIA

TECHNICAL FIELD

The present invention relates to a contact medium, an apparatus and method for treating wastewater by means of natural aeration using the contact medium, and more particularly to a contact medium for purifying wastewater using a pair or a multi-stage laminated structure of plural pairs of biofilm contact layers alternately arranged, each biofilm contact layer including a panel member formed to have a ball, plate or rope shape and fibers attached to the panel member, an apparatus and method for treating wastewater using the contact medium.

BACKGROUND ART

As well known to those skilled in the art, wastewater treatments are divided into a percolating filter method, an activated sludge method, a contact oxidation method, etc. In the percolating filter method, wastewater after first sedimentation flows on crushed stones provided with a mucous membrane of microorganisms or other contact medium, thereby causing organic matters in the wastewater to contact a biofilm to purify the wastewater.

Here, the mucous membrane of the microorganisms mainly includes bacteria, and in a favorable condition, includes higher organisms such as sludge worms, larvae of flies, rotifers, etc. Nitrifying bacteria may exist at the deep portion of the mucous membrane to carry out nitrification.

The percolating filter method generally belongs to aerobic treatments. However, the mucous membrane of the contact medium used in the percolating filter method includes aerobic bacteria within the outer layer of 0.1 mm to 0.2 mm and anaerobic bacteria in the inside. The percolating filter method has an excellent capacity for coping with a variation in a wastewater load to be treated, does not requires the return of sludge, only generates a small amount of sludge, allows equipment to be constructed and managed at reduced cost and to be easily operated. However, in case that the contact medium has a large depth, the percolating filter method has drawbacks of generating offensive odor and a clogging in the contact medium, thereby causing flies swarming therein.

The activated sludge method is substituted for the above percolating filter method. In the activated sludge method, organic matters dissolved in wastewater are taken and decomposed by organisms in an aeration tank, etc., and the organisms grown thereby are solidified and precipitated in a final precipitation tank. A portion of the precipitated organisms is returned as activated sludge to the aeration tank, and the remaining portion of the precipitated organisms is discharged as waste sludge.

Since the activated sludge method has excellent processing efficiency in wastewater treatment, this method has been widely utilized now. However, in case that the activated sludge method is used to treat wastewater on a small-scale, this method cannot cope with the variation in a wastewater load to be treated, requires expert skill in adjusting the amount of sludge (microorganisms) and supplied air and excessive power cost, and generates sludge bulking.

The contact oxidation method may be referred to as a fixed-type activated sludge method, and is one of methods for treating organic wastewater using a biofilm. In this method, an aeration tank is filled with a contact medium, and the biofilm contacts the wastewater and the surface of the contact medium so that organic matters in the wastewater are removed.

Since the amount of organisms generated in the contact medium in the contact oxidation method is determined by a wastewater load condition, it is difficult to adjust the amount of the organisms. Further, since the sludge is created in proportion to the amount of the load, in case that the load is large, the contact oxidation method has problems that the load condition is limited such as the clogging of the contact medium, and it is difficult to uniformly aerate the aeration tank, thus generating a dead space therein.

Many researches on the aforementioned wastewater purification have been carried out. Korean Utility Model Reg. Appln. No. 1993-2216 discloses an equipment and method for purifying wastewater using anaerobic/aerobic contact circulation methods. The wastewater purification equipment disclosed by this application serves to purify wastewater using microorganisms, and comprises a precipitation-separation tank for precipitating solid substances and impurities contained in influent wastewater and then separating the precipitated substances from the wastewater, first and second anaerobic filtering tanks filled with an anaerobic filter medium for improving the removal of nitrogen components and organic matters from the wastewater, first and second contact aeration tanks filled with a contact medium including an aerobic microorganism layer and provided with an aerator for separating the organic matters from the wastewater, and a center wall into which the wastewater from the above tanks is introduced.

The above wastewater purification equipment further comprises a precipitation tank provided with an air lift pump for recycling the decant water and a measuring device, a disinfection tank for finally disinfecting the wastewater, and an effluence tank for discharging the finally-treated wastewater. The precipitation tank, the disinfection tank, and the effluence tank are connected from an influx side to an efflux side of the equipment.

However, since the above wastewater purification equipment is not provided with a device and process for periodically back-washing the anaerobic filter medium and discharging the back washing water, when the equipment is used for a long period of time, the anaerobic filter medium is clogged and a contact dimension between the wastewater and the anaerobic filter medium is reduced. Thus, the purification efficiency of the anaerobic filter medium is reduced. Further, solid substances are accumulated onto the anaerobic filter medium for a long term, thus reducing the processing capacity of the tank and inducing offensive odor. Moreover, recycled water is supplied from the precipitation tank to the anaerobic filtering tank, thereby allowing sludge (sedimentation) to be accumulated in the anaerobic filtering tank and degrading the anaerobic condition of the anaerobic filtering tank. When the water flows out of the precipitation tank, pollutants remaining in the water are also discharged to the outside.

In order to solve the above problems, Korean Patent Appln. No. 2000-54525 discloses a wastewater treatment apparatus using the anaerobic/aerobic contact circulation method and an attached filter method. As shown in FIG. 1, wastewater is recycled through a circulation tank and a contact aeration tank and treated under in anaerobic and aerobic conditions, finally treated by an attached filter tank, and subsequently flown out. Accordingly, it is possible to effectively discharge sedimentation, which degrades the treatment efficiency, to supply microorganisms in an activated state to the wastewater in the tanks, and to maximize the treatment efficiency due to the removal of residual pollutants.

The wastewater treatment apparatus disclosed by the Korean Patent Appln. No. 2000-54525 comprises precipitation-separation tank 91; first and second circulation tanks 92 and 93, each provided with an anaerobic filter medium for decomposing water overflowing the precipitation-separation tank 91 using anaerobic microorganisms and a back-washing pipe for removing sludge excessively attached to the filter medium; first and second contact aeration tanks 94 and 95 located adjacent to each other, each provided with an aerobic filter medium for decomposing water overflowing the second circulation tank 93 using aerobic microorganisms, a back-washing pipe for removing sludge excessively attached to the aerobic filter medium, and a diffusing pipe; a precipitation tank 96 for returning a part of the water treated by the second contact aeration tank 95 to the first circulation tank 92 via a circulation pipe, precipitating sludge from the water overflowing the second contact serration tank 95, and transferring the sludge via an excessive sludge transfer pipe using an air lift pump to the precipitation-separation tank 91 to discharge the sludge; an attached filter tank 97 for treating residual pollutants from the water overflowing the precipitation tank 96 using an attached filter medium; a back-washing water transfer pump for separating sludge excessively attached to the attached filter medium via a back-washing pipe installed within the attached filter tank 97 and simultaneously transferring the separated sludge to the precipitation-separation tank 91 via the back-washing transfer pipe to discharge the sludge; and a blower 90 for performing the aeration, the back-washing, and the air lift functions required by each tank.

In the above wastewater treatment apparatus, wastewater is influent into the precipitation-separation tank 91 so that solid substances and impurities contained in the wastewater are precipitated in the precipitation-separation tank 91. The wastewater first-treated by the precipitation-separation tank 91 overflows the precipitation-separation tank 91 and is fed to the first and second circulation tanks 92 and 93 so that nitrogen components are removed from the wastewater using anaerobic bacteria of the anaerobic filter media. Then, the wastewater, from which the nitrogen components are removed, overflows the second circulation tank 93 and is fed to the first and second contact aeration tanks 94 and 95 so that organic matters of the water are decomposed by aerobic bacteria. The wastewater, in which the organic matters are decomposed, is introduced into the precipitation tank 96 so that residual organic matters are precipitated in the precipitation tank 96. The wastewater overflows the precipitation tank 96 and is introduced into the attached filter tank 97 provided with the attached medium so that residual pollutants are removed by aerobic bacteria activated by supplied oxygen. Then, the wastewater treated through the above tanks is discharged to the outside.

This wastewater treatment apparatus has a complicated structure and purifies wastewater via multiple stages, thus requiring a large space for the installation. Further, such a wastewater treatment apparatus requires the supply of oxygen, thereby causing economical burden and troublesomeness to users. Particularly, the wastewater treatment apparatus does not completely purify the wastewater so that the purified water may be reusable, but only purifies the wastewater so that the purified water reaches an allowable level to be discharged, thus not having reusable effect of the resulted water.

Moreover, the above wastewater treatment apparatus determines its purification process to be finished when the wastewater passes through each tank just one time, and consequently discharges the processed water to the outside. Accordingly, the above wastewater treatment apparatus discharges the water from which pigments and odor are not completely removed, thus inducing water pollution and destructing an ecosystem.

DISCLOSURE OF THE INVENTION

Therefore, the present invention has been made in view of the above problems, and it is an object of the present invention to provide a contact medium for purifying wastewater using a pair or a multi-stage laminated structure of plural pairs of biofilm contact layers alternately arranged, an apparatus and method for treating wastewater using the contact medium, thereby improving the purification efficiency of the wastewater and minimizing water treatment equipment using the stack structure of the biofilm contact layers.

In accordance with one aspect of the present invention, the above and other objects can be accomplished by the provision of a contact medium comprising a panel member formed to have a ball, plate or rope shape, and synthetic fibers with a diameter of less than 0.01 mm and a length of less than 100 mm attached to the external surface of the panel member.

Preferably, in order to improve the wastewater treatment efficiency, the synthetic fibers may have a diameter of less than 0.1 mm and a length of less than 40 mm. Further, preferably, polyethylene, polypropylene, vinylene, polyamide, poly-epoxy resin, polyurethane, melamine, polycarbonate, polyacrylate, polyvinyl alcohol, etc. may be used as a material of the synthetic fibers.

In accordance with another aspect of the present invention, there is provided an apparatus for treating wastewater using a contact medium, comprising: a wastewater collection tank for collecting the wastewater; a biofilm contact reactor including a plurality of first and second biofilm contact layers alternately arranged vertically or horizontally in a collecting hopper; a precipitator for receiving the wastewater from the wastewater collection tank and the first-treated wastewater from the collecting hopper, and then precipitating sludge contained in the wastewater; and a wastewater circulation unit for recycling decant water in the precipitator and the wastewater collection tank into the biofilm reactor.

In accordance with yet another aspect of the present invention, there is provided a method for treating wastewater using a contact medium, comprising the steps of: allowing wastewater to be collected by a wastewater collection tank; allowing the wastewater to pass through a biofilm contact reactor including a plurality of first and second biofilm contact layers alternately arranged vertically or horizontally in a collecting hopper; allowing the wastewater from the wastewater collection tank and the first-treated wastewater from the collecting hopper to be introduced into a precipitator so that sludge contained in the wastewater is precipitated in the precipitator; and allowing decant water in the precipitator and the wastewater collection tank to be recycled into the biofilm reactor by a wastewater circulation unit.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in detail with reference to the annexed drawings.

The present invention employs advantages of the conventional percolating filter method, activated sludge method, and contact oxidation method used in wastewater treatment equipment, and simultaneously employs a multi-stage laminated structured biofilm method using the fall of water.

Figure 1:
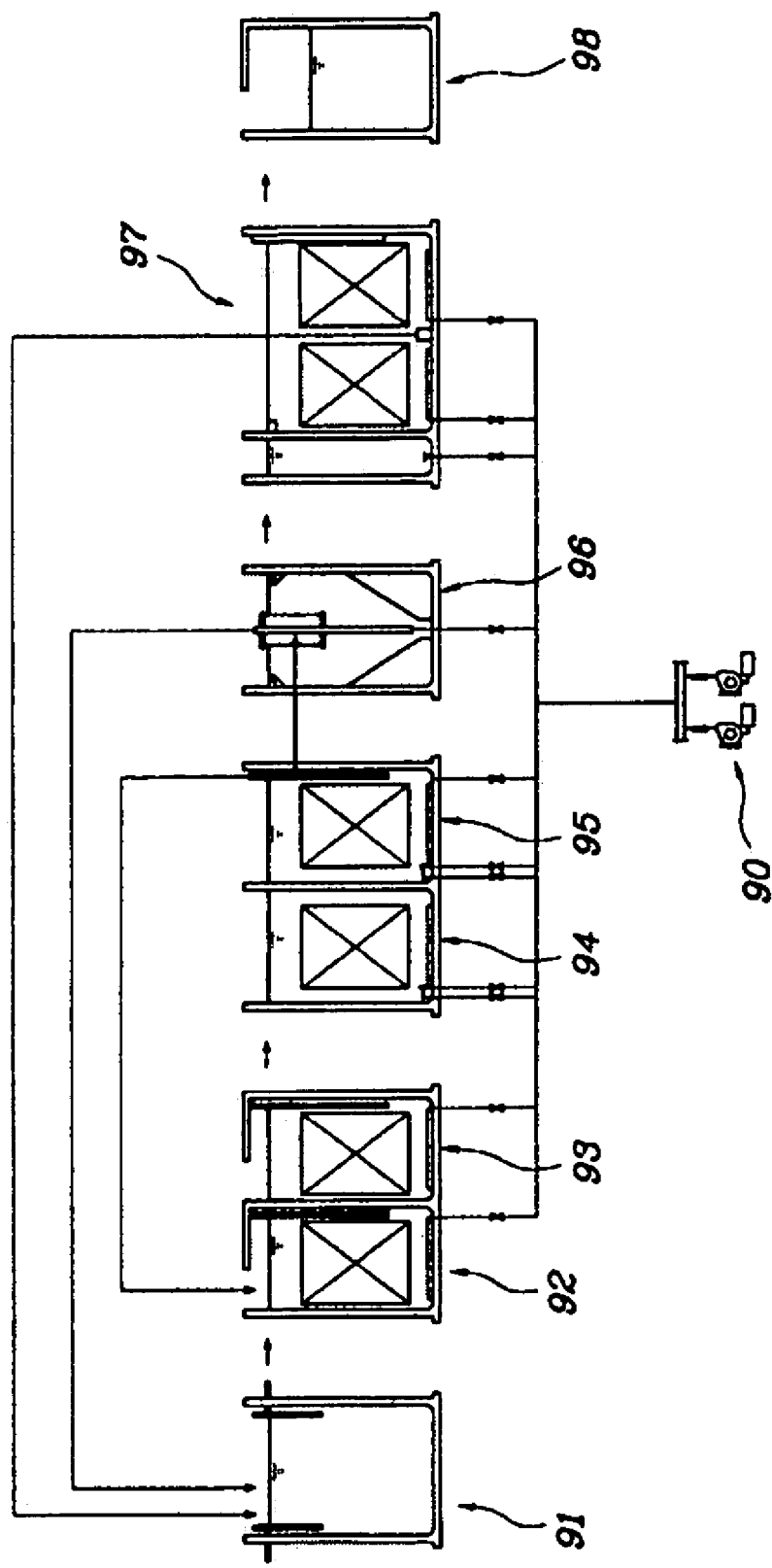
FIG. 1 is a schematic view illustrating a system and method for treating wastewater by means of conventional anaerobic/aerobic contact circulation method and attached filter method.
Figure 2A:
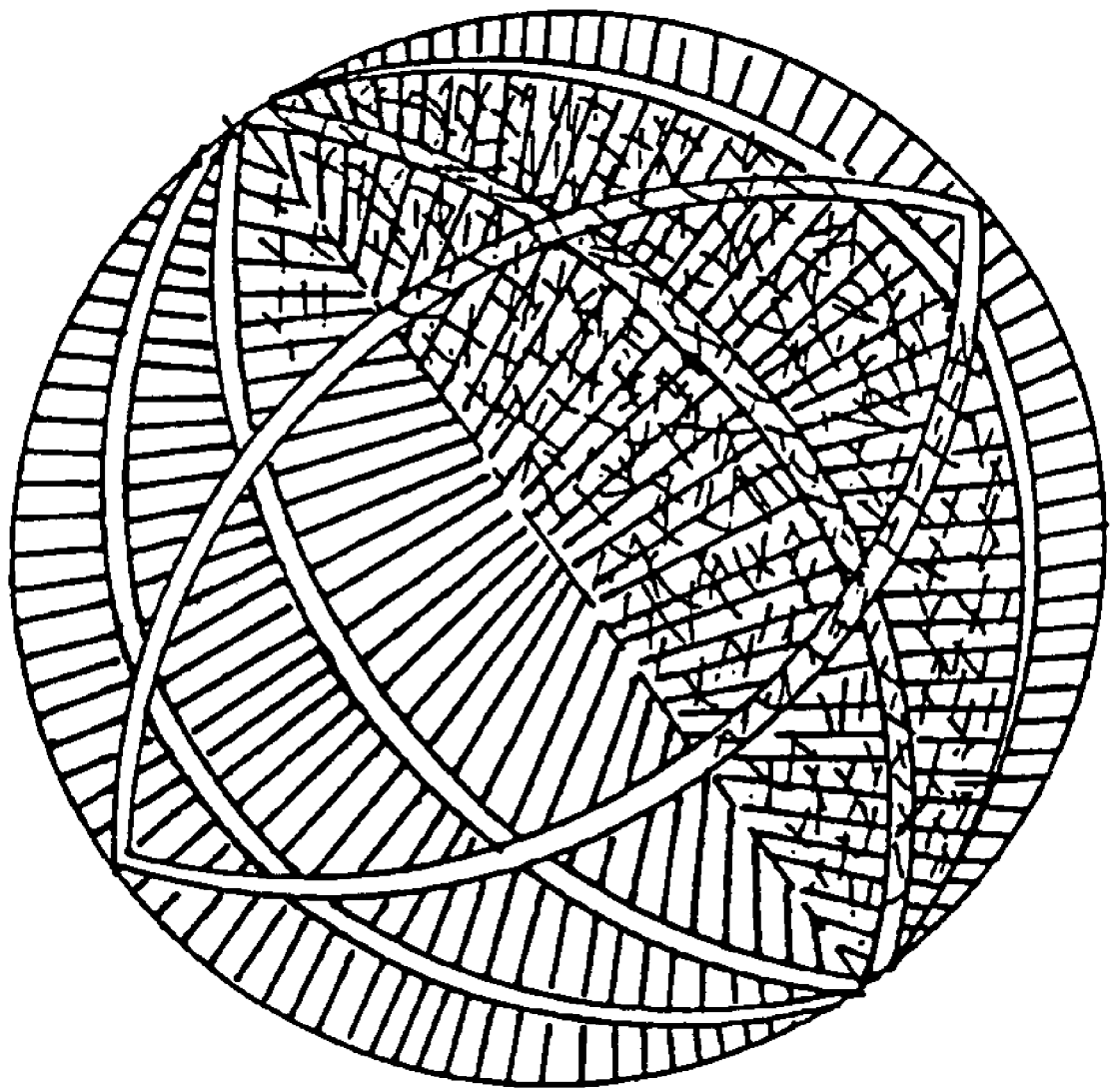
FIGS. 2a and 2b are perspective views of a contact medium in accordance with the present invention.
Figure 2B:
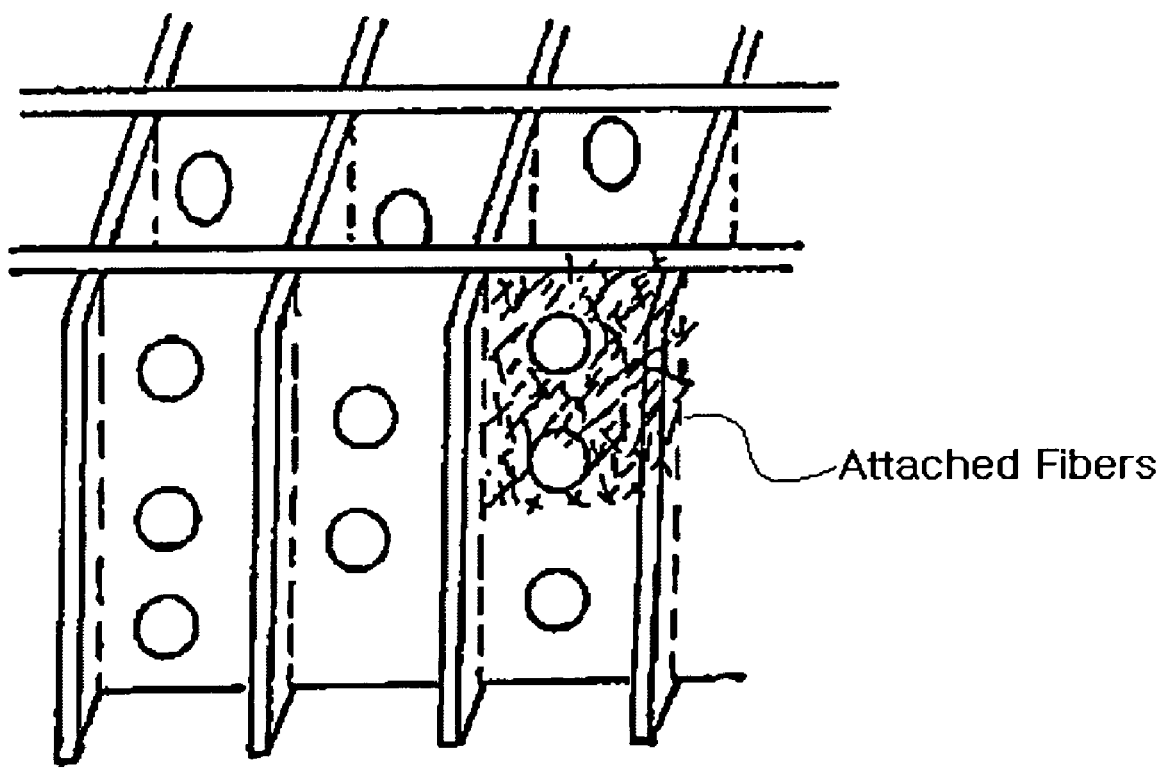
Figure 3:
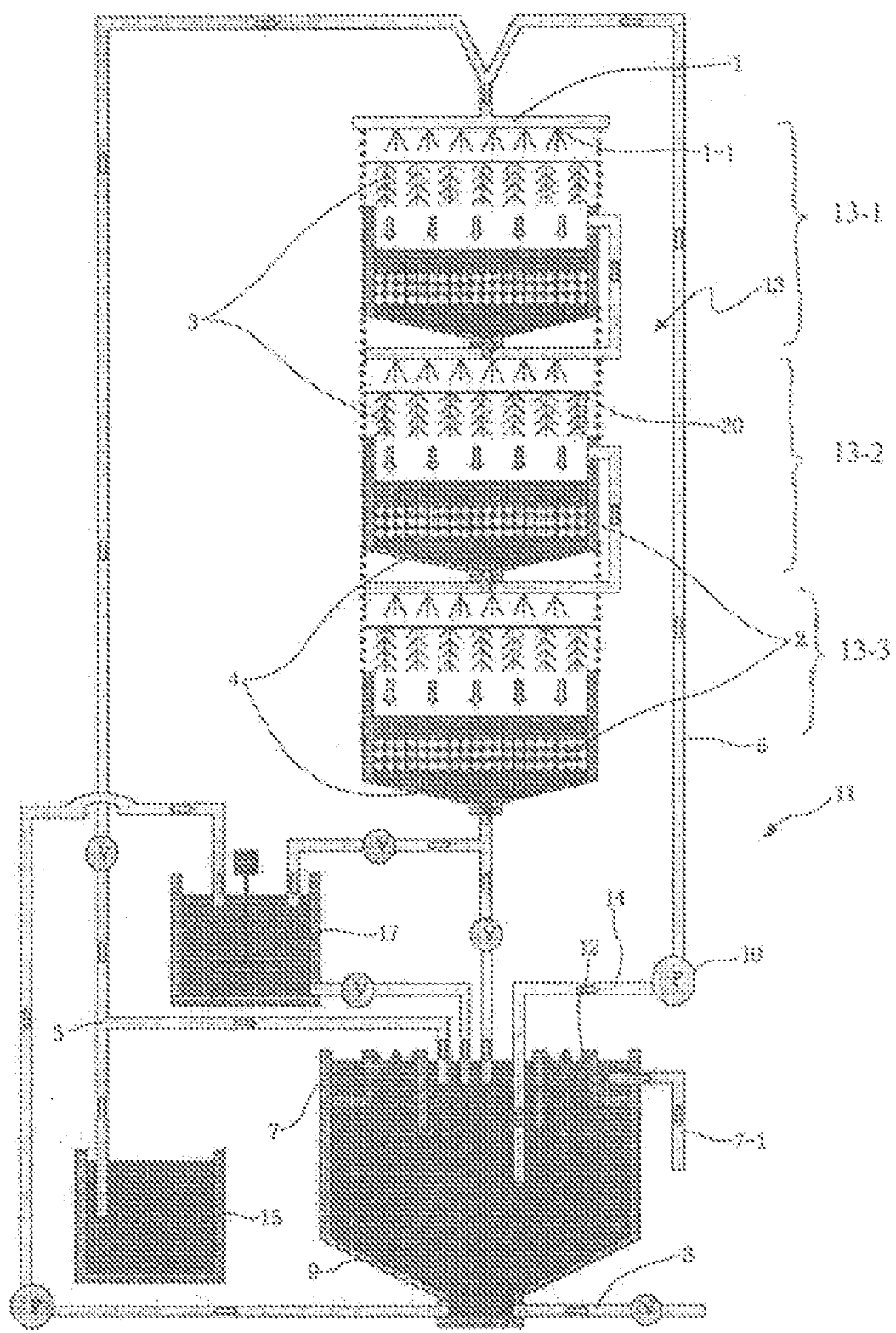
FIG. 3 is a perspective view of an apparatus for treating wastewater using a contact medium in accordance with the present invention.
Figure 4A:
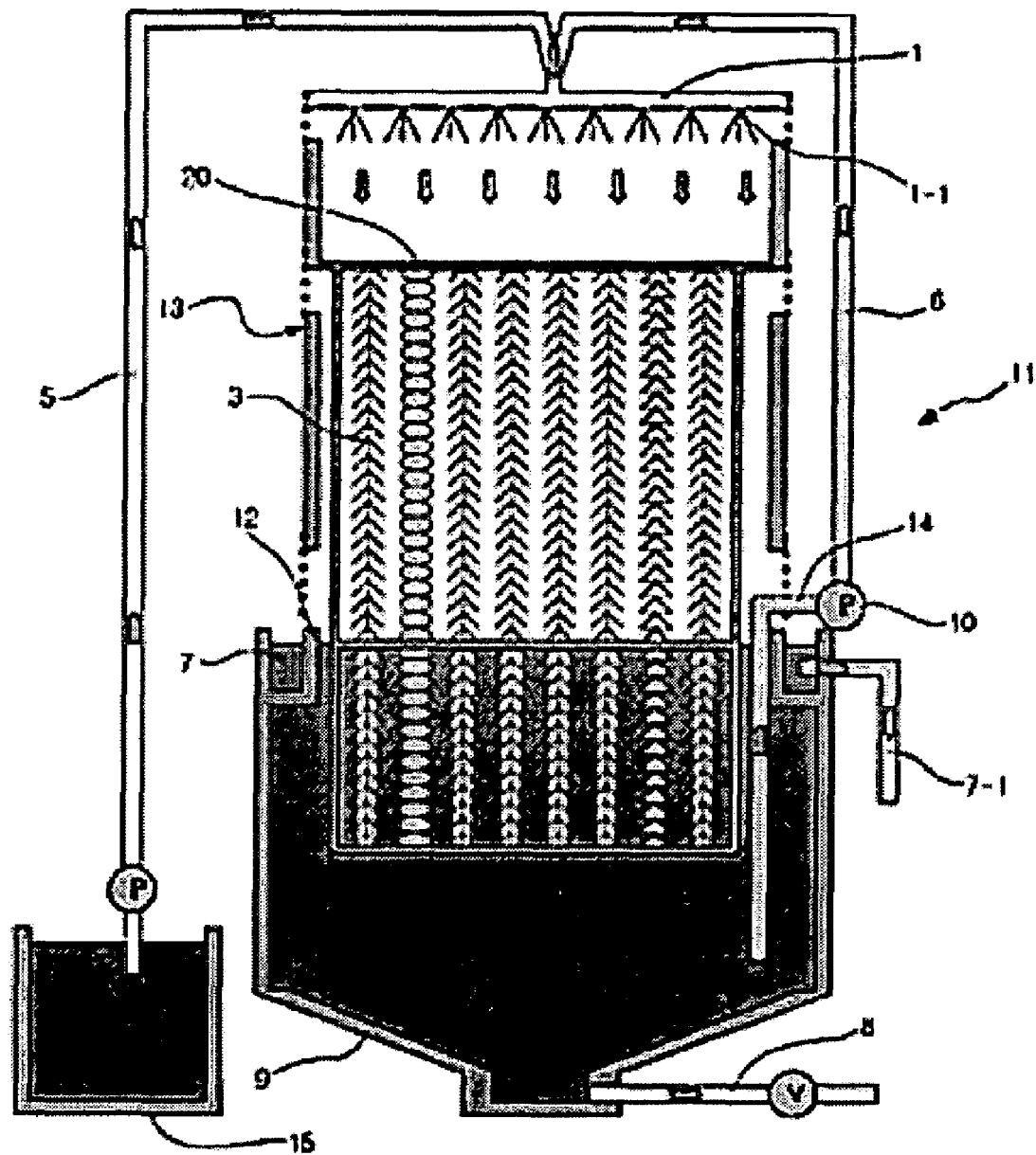
FIG. 4a to 4d are perspective views of individual installation positions of the contact medium of the apparatus for treating wastewater using the contact medium in accordance with the present invention.
Figure 4B:
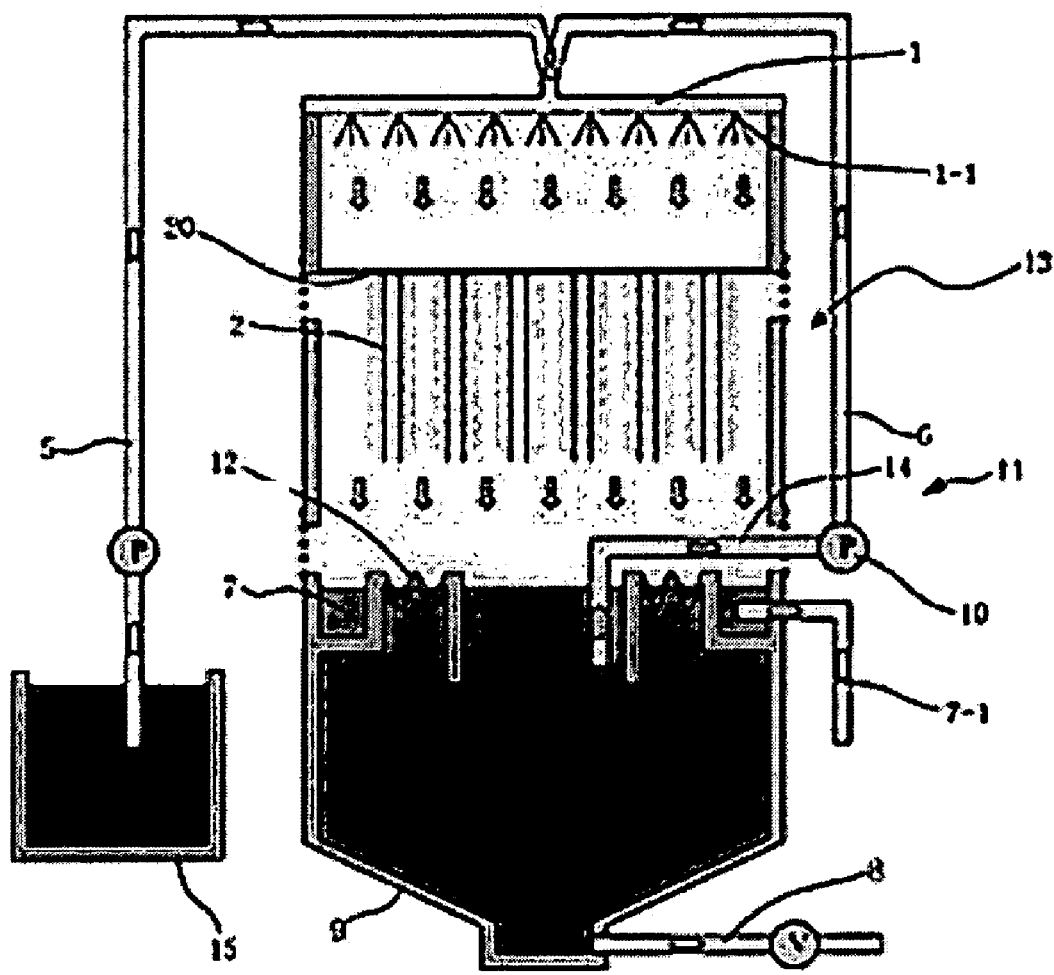
Figure 4C:
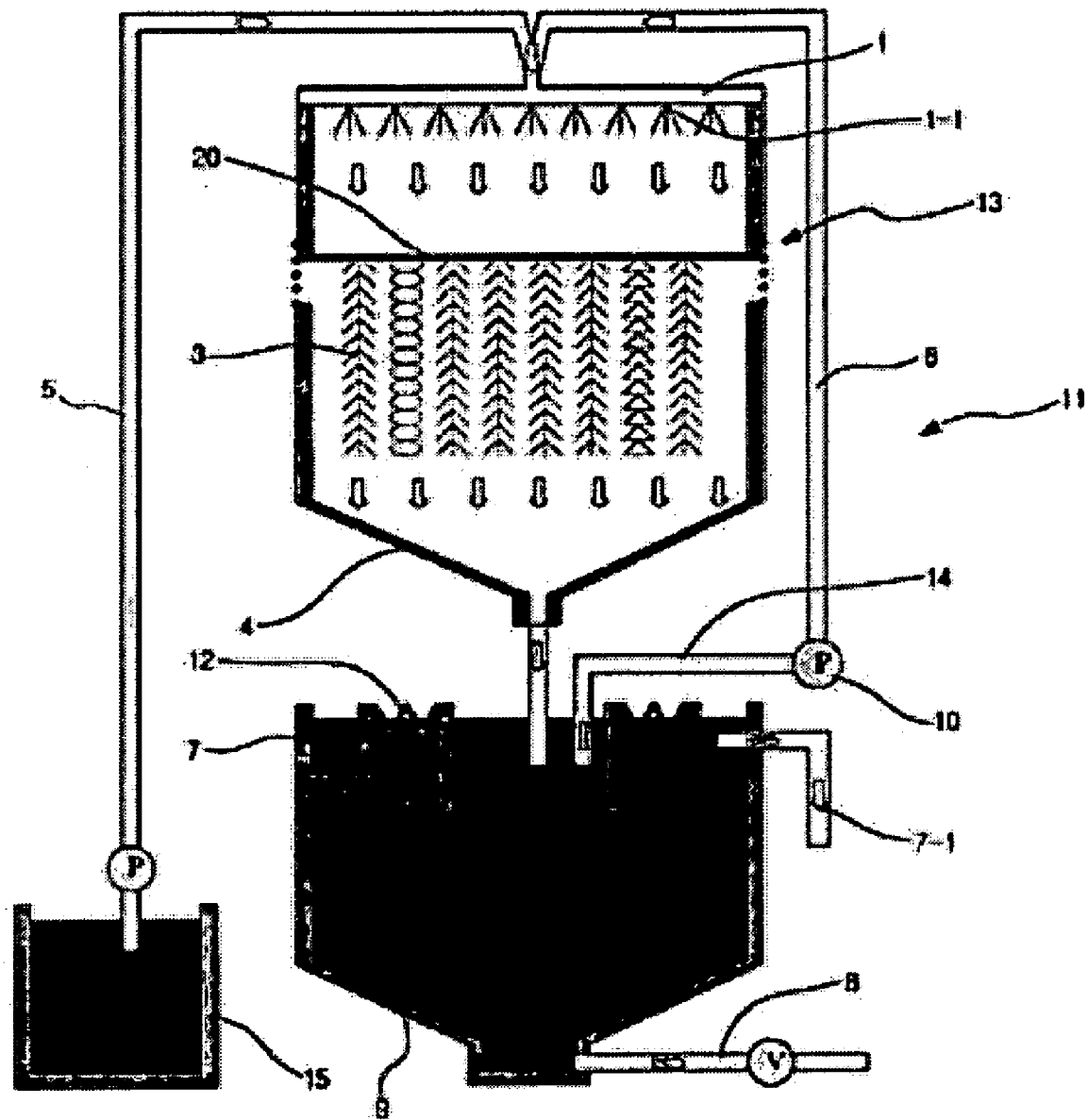
Figure 4D:
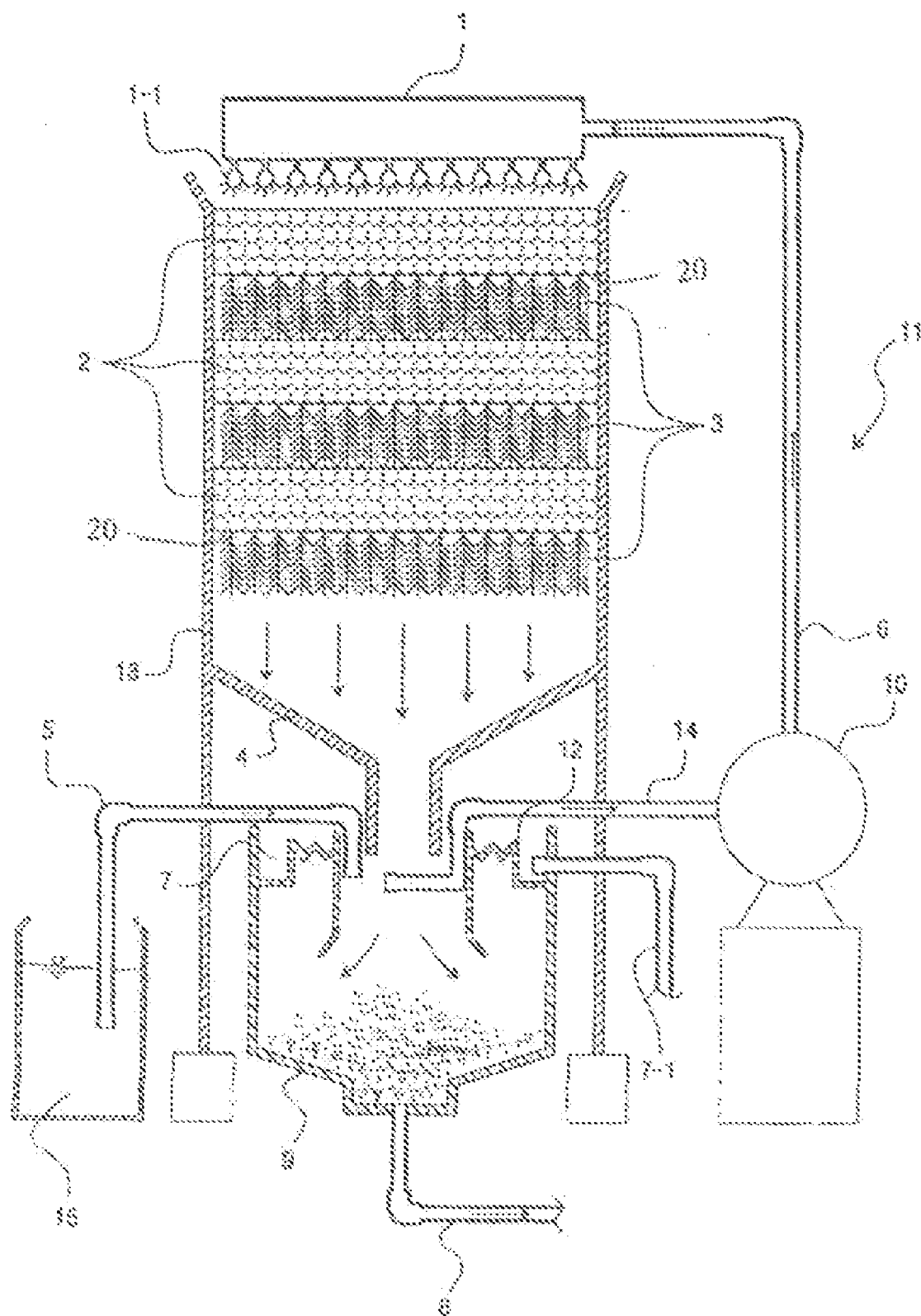
Figure 5:
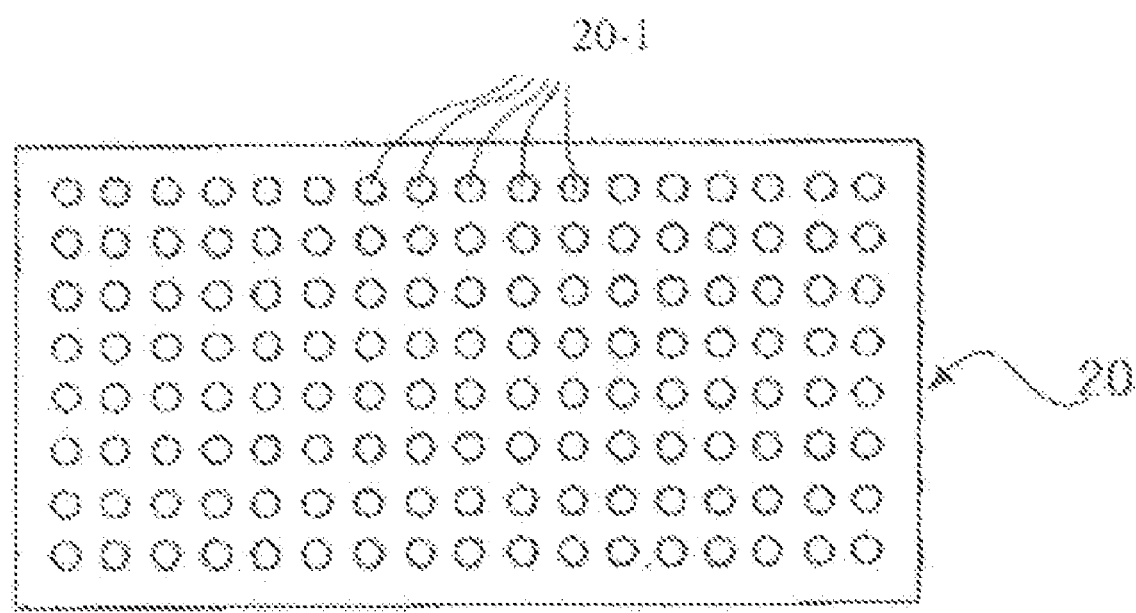
FIG. 5 is a perspective view of an intermediate diaphragm for filling the contact medium of the apparatus for treating wastewater using the contact medium in accordance with the present invention.

As shown in FIG. 3, a biofilm reactor 13 of the present invention has a multi-stage laminated structure in which a pair of first and second biofilm contact layers 2 and 3 are alternately arranged vertically.

Here, the first biofilm contact layer 2 includes a fixed fibrous-type medium with various shapes, which has been generally used. That is, a biofilm is formed in the medium having a panel member formed to have a ball, plate or rope shape, and fibers attached to the external surface of the panel member.

Each of first contact media 2a and 3a of the present invention includes a panel member formed to have a ball, plate, or other designated shape, and fibers with a diameter of less than 0.1 mm and a length of less than 400 mm attached to the external surface of the panel member. The first and second biofilm contact layers 2 and 3 are formed by integrally combining a plurality of the first and second contact media 2a and 3a in the transverse or longitudinal direction of the first and second biofilm contact layers 2 and 3.

An apparatus for treating wastewater using the contact media of the present invention includes the above first and second biofilm contact layers 2 and 3. Here, the second biofilm contact layer 3 includes flowing fibrous-type contact media formed to have a branch shape, and the first biofilm contact tank 2 includes rope-shaped contact media longitudinally extended by locking the media with one another.

The first and second biofilm contact layers 2 and 3 are made of various contact media such as a fixed fibrous-type contact medium or flowing fibrous-type contact medium. The biofilm is formed by the fibers fixedly attached to the external surface of the panel member.

A plurality of discharging holes 20-1 are formed through an intermediate diaphragm 20 formed at the bottom of the first and second biofilm contact layers 2 and 3. The discharging holes 20-1 have plate or ball shaped exteriors so that the falling wastewater collides with the discharging holes 20-1 by the fall of water and thus is sprayed around to be in contact the biofilm on the fibers.

The biofilm reactors 13-1, 13-2 and 13-3 comprising the separate biofilm contact layers 2 and 3 are formed to have a hopper shape. A through hole is formed through the biofilm reactor 13 at a designated height so that the wastewater is automatically discharged when the wastewater reaches a designated amount. A nozzle for spraying the wastewater is formed through the top of the biofilm reactor 13, and a spray control valve for discharging the wastewater to the lower tank is formed through the bottom of the biofilm reactor 13.

The first biofilm contact layer 2 treats the wastewater sprayed from a nozzle 1-1 of a nozzle pipe 1 using the biofilm formed around fibers by means of aerobic and anaerobic bacteria. The second biofilm contact tank 3 treats again the wastewater sprayed by the collision to the intermediate diaphragm 20 by means of the fall of water using the biofilm formed around the fibers, thereby purifying the wastewater.

A collecting hopper 4 is installed at the bottom of the biofilm reactor 13, thereby collecting the wastewater purified through the first and second biofilm contact layers 2 and 3 and causing the collected wastewater to fall down to a precipitator 9.

Here, the precipitator 9 installed below the collecting hopper 4 of the biofilm reactor 13 receives wastewater from a wastewater collection tank 15 via a wastewater supply pipe 5, and allows sludge contained in the wastewater to be naturally precipitated therein and then to be discharged to the outside via a sludge discharge pipe 8.

Particularly, decant water from the precipitator 9 in which the sludge is precipitated or which the wastewater is purified via the bioflim reactor 13 is supplied to the nozzle pipe 1 via first and second circulation pipes 5 and 6 by means of the pumping of a circulating pump 10.

The decant water in the precipitator 9 obtained by removing sludge contained therein by the precipitation and repeated recycling of the biofilm reactor 13 overflows from the precipitator 9 via an overflow wall 12, and is stored in an overflow tank 7. Then, the water stored in the overflow tank 7 in a final purified condition is discharged via an overflow water pipe 7-1. The precipitator 9 and the collecting hopper 4 are each connected to a nitrogen/phosphorous treatment tank 17 to selectively treat nitrogen and phosphorous.

Since the wastewater contained in the precipitator 9 is repeatedly processed via the precipitation and recycling purification, the retention time of the wastewater in the precipitator 9 is lengthened. Accordingly, it is possible to protect the wastewater from being damaged by anaerobic bacteria.

The nozzle pipe 1 installed above the upper portion of the biofilm reactor 13 sprays the wastewater, recycled by the second circulation pipe 6, via a plurality of the nozzles 1-1 into the upper portion of the biofilm reactor 13.

By the alternating biofilm contact layers 2 and 3 vertically arranged in pairs within the biofilm reactor 13 to form a multi-stage laminated structure, it is possible to considerably enhance the wastewater purification efficiency while achieving compactness of the installation so as to minimize a space required the installation of the apparatus.

Since influent wastewater and recycled wastewater are mixed in the precipitator 9, the concentration of total organic matters in the wastewater within the first and second biofilm contact layers 2 and 3 can be diluted, BOD (Biochemical Oxygen Demand) is easily managed, a load factor and a shearing force of the influent wastewater are increased so that the mucous membranes of microorganisms are continuously peeled off, thus preventing the excessive growth of microorganisms and the propagation of flies thereby.

Further, the wastewater treatment apparatus of the present invention purifies wastewater by means of the natural fall of water, thereby not requiring an oxygen supply device such as a blower. The precipitator 9, the collecting hopper 4, the wastewater connection tank 15, and the nitrogen/phosphorous treatment tank 17 are formed in a hopper shape to discharge sediments.

Figure 6A:
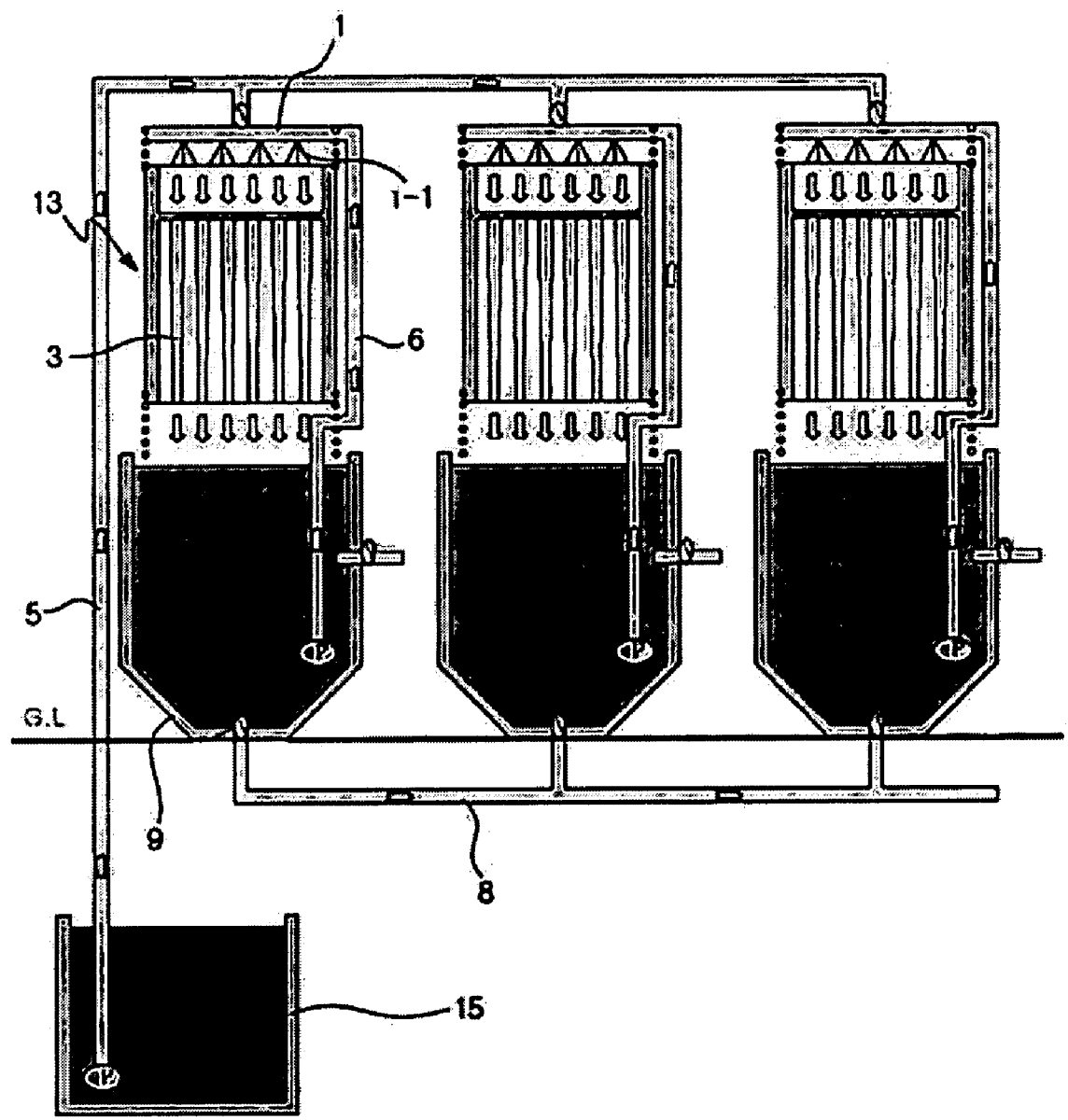
FIGS. 6a and 6b are respectively perspective views of apparatuses for treating wastewater using a contact medium in accordance with other embodiments of the present invention.

As shown in FIG. 6a, an apparatus for treating wastewater according to the present invention is configured in such a way that a plurality of collecting hoppers are connected to the same pipe, which receives the wastewater, to perform, in the following order, an operation, water collection, and a discharge. Each collecting hopper correspondingly installs a bioflim reactor 13 on its upper side.

Figure 6B:
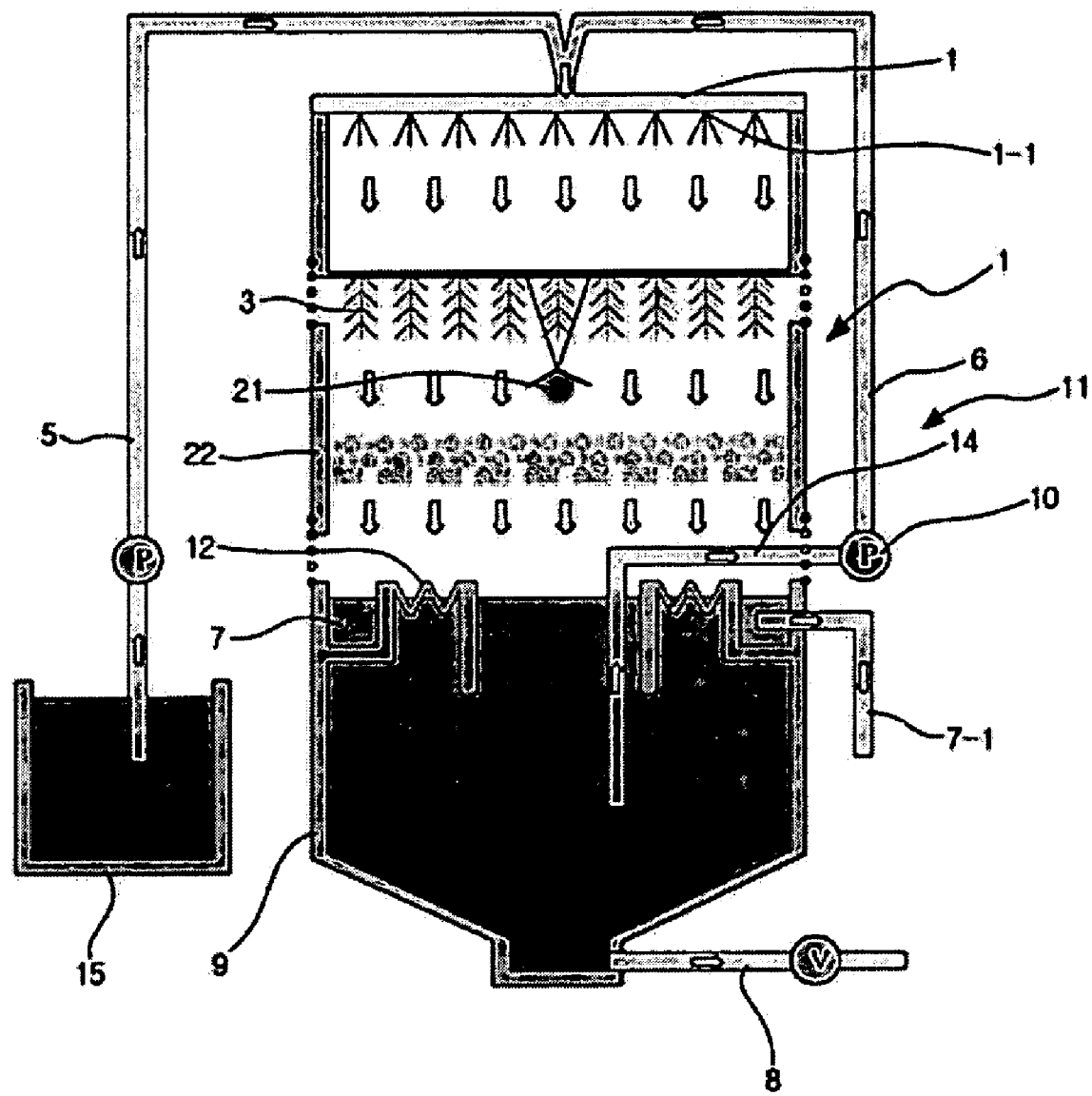
Figure 7A:
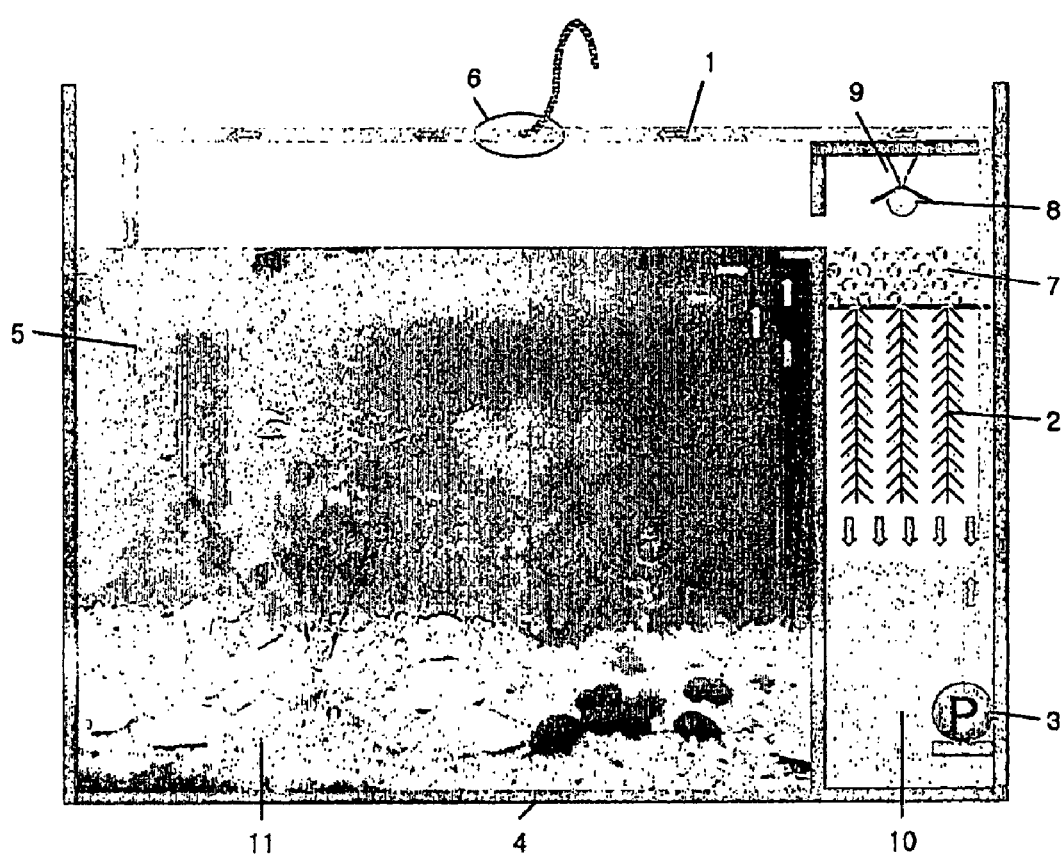
FIGS. 7a and 7b are perspective views of individual installation positions of the contact medium of the apparatuses for treating wastewater in accordance with other embodiments of the present invention.
Figure 7B:
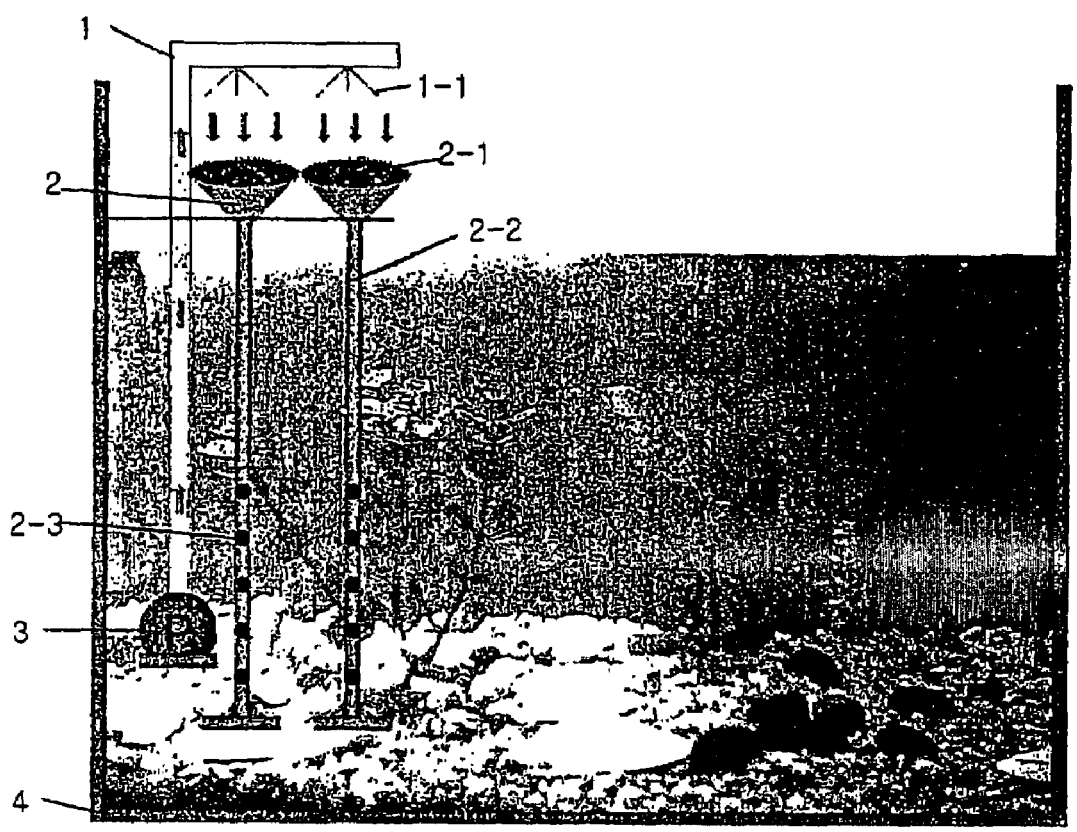

As shown in FIG. 6b, an apparatus for treating wastewater according to the present invention is configured in such a way that biofilm contact medium 33 is stacked in a single or multi stages in a biofilm reactor 13, and a titanium reactor 21 is located below the biofilm reactor 13. An ultraviolet ray lamp 22 is located above the titanium reactor 21, and fixed to an ultraviolet ray lamp fixture 22-1.

The precipitator 9 is located below the biofilm reactor 13 so that the wastewater purified via the second biofilm contact layer 3 and the titanium reactor 21 is fallen down to the precipitator 9.

Alternatively, the titanium reactor 21 may be located at the uppermost portion of the biofilm rector 13 so that solar heat is used to induce a chemical reaction in the titanium reactor 21.

As the titanium reactor 21, titanium may be applied to a porous plate to form a thin film or applied to ball-shaped structures with a diameter of approximately 3 mm to 5 mm.

In case that ultraviolet ray with a designated wavelength ($\lambda < 400$ nm) having energy of more than a band gap is irradiated on the surface of $TiO_2$ of the above-described titanium reactor 21, electrons of TiO2 are transferred from a Valence band to a Conduction band, thereby leaving holes at transferred electrons' seats in the valence band.

The created electrons and holes are diffused into the surface of $TiO_2$, and the holes react with water or $OH^-$ attached to the surface of $TiO_2$, thereby forming OH radicals. Otherwise, the electrons react with oxygen dissolved in the wastewater, thereby forming $O_2^{2-}$ radicals. Accordingly, it is possible to further increase the amount of radicals, thus decomposing organic matters located at the surface of the $TiO_2$. This reaction is referred to as "photocatalysis". OH radicals and $O_2^{2-}$ radicals may be formed out of $H_2O_2$ produced as an intermediate product of the reaction. $H_2O_2$, $HO_2$, $O_2$ react with the created electrons, thereby consuming the electrons to prevent the recombination of the electrons and increasing the creation of OH radicals. In photocatalysis, OH radicals and $O_2^{2-}$ radicals are used as oxidants for oxidizing the organic matters.

INDUSTRIAL APPLICABILITY

As apparent from the above description, the present invention provides a contact medium for purifying wastewater using biofilm contact layers, an apparatus and method for treating wastewater using contact medium. By this arrangement, it is possible to achieve a considerable enhancement in wastewater purification efficiency while achieving compactness of the installation, to reduce the load of the equipment by diluting the concentration of organic matters dissolved in the wastewater, to easily manage BOD based on the load, to continuously peel off mucous membranes of microorganisms by increasing the load factor and shearing force of influent wastewater, to prevent the excessive growth of the microorganisms and the propagation of flies, and to omit an oxygen supply device such as a blower by purifying the wastewater by means of the natural fall of water.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An apparatus for treating wastewater using a contact medium, comprising:

a wastewater collecting tank for collecting the wastewater;

a bioflim contact reactor having:

a plurality of collecting hoppers each connected to a pipe which receives the wastewater, to perform, in the following order, an operation, water collection, and a discharge;

a single biofilm contact layer or a plurality of alternating first and second biofilm contact layers, arranged vertically or horizontally in each collecting hopper;

an intermediate diaphragm adjacent the biofilm contact layer or layers, the intermediate diaphragm including a plurality of discharging holes at one side thereof, the plurality of discharging holes having plate or ball shaped exteriors; and contact media attached above and below the intermediate diaphragm and including flowing fibrous-type biofilm media, wherein the contact media is installed in such a way that one end thereof is soaked with the wastewater in the collecting hopper;

a precipitator for receiving the wastewater from the wastewater collection tank and treated wastewater from the collecting hopper, the precipitator being connected to the wastewater collection tank and a nitrogen/phosphorous treatment tank for selectively treating nitrogen and phosphorous, the precipitator including an overflow tank with an overflow wall over which decant water flows, which is connected to the nitrogen/phosphorous treatment tank; and a wastewater circulation unit for recycling decant water collected by the overflow tank from the precipitator and collected from the wastewater collection tank back into the biofilm reactor, wherein each collecting hopper includes:
- a plurality of nozzles for spraying wastewater supplied from first and second circulation pipes at the top of the hopper;
- a spray control valve for adjusting the spray amount of the wastewater at the bottom of the hopper; and
- a bypass unit formed therethrough at a designated height.

2. The apparatus as set forth in claim 1, wherein the collecting hopper includes a titanium reactor installed at the bottom thereof; and wherein the titanium reactor includes a porous plate, on which a thin titanium film forms, and balls with a diameter of 3-5 mm at the inside thereof, in which the balls form a thin titanium film.

* * * * *